United States Patent [19]
Schurdak

[11] 3,888,825
[45] June 10, 1975

[54] COPPER INHIBITORS FOR POLYOLEFINS

[75] Inventor: Edward Joseph Schurdak, Somerville, N.J.

[73] Assignee: American Cyanamid Company, Stamford, Conn.

[22] Filed: Oct. 19, 1973

[21] Appl. No.: 408,213

[52] U.S. Cl.... 260/45.85 B; 252/401; 260/45.9 NC; 260/45.95 R; 260/45.95 H; 260/45.95 C
[51] Int. Cl. .......................................... C08f 45/60
[58] Field of Search ............... 260/45.9 NC, 559 H; 252/401

[56] References Cited
UNITED STATES PATENTS
3,734,885  5/1973  Muller et al. ...................... 260/45.9
3,772,245  11/1973  Dexter........................ 260/45.9 NC

OTHER PUBLICATIONS

Grekov, "Organic Scintillator Materials," *Chem. Abstracts*, Vol. 58, p. 3418c,d, 1963.
Zadorozhnyi et al., "Structure of Diacylhydrazines," *Chem. Abstracts*, Vol. 65, p. 7092g, 1966.

*Primary Examiner*—V. P. Hoke
*Attorney, Agent, or Firm*—Philip Mintz

[57] ABSTRACT

Compounds of the formula

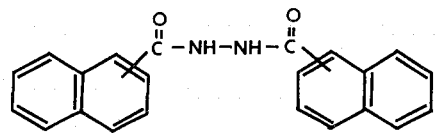

are useful, in combination with hindered-phenol antioxidants, for inhibiting thermal degradation of polyolefins, especially polypropylene, in contact with copper as metal, alloys, oxides, or salts. Such compounds are prepared by reacting a naphthoyl chloride or a naphthoic acid ester with hydrazine.

11 Claims, No Drawings

COPPER INHIBITORS FOR POLYOLEFINS

This invention relates to the stabilization of polyolefins, especially those wherein the polyolefin chain contains a plurality of tertiary carbon atoms or branch points, such as polypropylene and polybutene-1, against degradation when in contact with copper, copper alloys, copper oxides, or copper salts. It also relates to certain novel compounds, useful in combination with hindered-phenol antioxidants for such stabilization.

It is well known that polyolefins are subject to degradation caused by heat, ultraviolet light, and oxygen and that many materials have been found to inhibit such degradation, such as antioxidants and ultraviolet absorbers. It is also well known that copper, whether in the form of copper metal, copper alloys, copper oxides, or copper salts, catalyzes or otherwise greatly increases the susceptibility of polyolefins to degradation on exposure to heat, as described in Hansen et al., J. Poly. Sci., Part A, Vol. 2, pp. 587–609 (1964), Hansen et al., Poly. Eng. & Sci., Vol. 5, October 1965, pp. 223–226, as well as in U.S. Pat. Nos. 3,440,210; 3,462,517; and 3,549,572. Other transition metals also catalyze the heat degradation of polyolefins similarly. Each of these references, and U.S. Pat. Nos. 3,110,696; 3,117,104; 3,660,438; German Pat. Nos. 2,124,641; 2,140,350; and Belgian Pat. No. 773,596, mention various classes of compounds which they either knew of or discovered as useful for inhibiting copper-catalyzed thermal degradation of polyolefins. The general class of hindered-phenol antioxidants normally used to provide protection to polyolefins against degradation by oxygen fails to provide adequate protection against copper-catalyzed degradation (Hansen et al., supra, and U.S. Pat. No. 3,549,572 col. 1, line 65 through col. 2, line 12 indicate that the presence of the antioxidant actually makes the copper-catalyzed degradation worse than its absence!) although they have been used in combination with some of the copper inhibitor compounds to provide enhanced protection. However, none of these compounds has proven to be completely satisfactory and the problem still awaits a satisfactory solution. Also, as pointed out in Hansen et al., page 594 bottom, predictability in this area is very poor since compounds similar to useful inhibitors were frequently useless. As a result, the use of polyolefins in contact with copper or other transition metals, as for insulation on copper wire for instance, has been limited.

In accordance with the present invention, it has been discovered that compounds of the formula

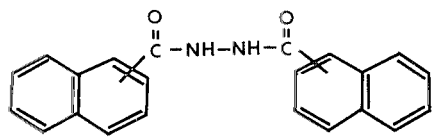

are effective to inhibit copper or other transition-metal catalyzed degradation of polyolefins, particularly those having a plurality of tertiary carbon atoms or branch points, such as polypropylene, when used in combination with hindered-phenol antioxidants.

These compounds can be prepared by reacting one mole of hydrazine with one mole of the appropriate naphthoic acid ester, or naphthoyl chloride in a suitable solvent, such as benzene to produce

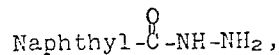

and then reacting such intermediate with another mole of the appropriate naphthoyl chloride to produce

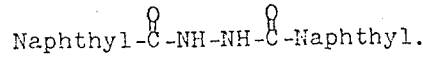

Alternatively, the hydrazine can be reacted in a single step with two moles of the naphthoyl chloride. The naphthoyl chloride can be prepared by reacting a naphthoic acid with thionyl chloride in the presence of a basic acid-acceptor, such as pyridine.

For effective stabilization of polyolefins against copper-catalyzed degradation, these compounds should be used in combination with a hindered-phenol antioxidant. Many hindered-phenol antioxidants are well known and are conventionally used in polyolefins. Illustrative of these hindered-phenol antioxidants are 6,6'-di-t-butyl-4,4'-bis-o-cresol; 4,4'-methylene-bis(3-methyl-6-t-butylphenol); 2,6-di-t-butyl-4-methylphenol; 2,2'-thiobis(4-methyl-6-t-butylphenol); 4,4'-thiobis(3-methyl-6-t-butylphenol); 2,2'-methylenebis(4-ethyl-6-t-butylphenol); the benzyl esters of β-(subst. hydroxyphenyl)propionic acids described in U.S. Pat. No. 3,649,667; tris (3,5-di-t-butyl-4-hydroxybenzyl)isocyanurate of U.S. Pat. Nos. 3,531,483 and 3,637,582; 2,4,6-trialkyl-3-(higher alkylthiomethylene)phenols of U.S. Pat. No. 3,660,352; 1,3,4-thiadiazole-bridged bis-thiomethylene-2,4,6-trialkylphenols of U.S. Pat. No. 3,676,449; and the like. Especially preferred is pentaerythrityl-tetrakis-3-(3,5-di-t-butyl-4-hydroxyphenyl) propionate of U.S. Pat. No. 3,285,855, sold as Irganox 1010.

In general, these compounds and the hindered-phenol antioxidants are used at total concentrations of about 0.01 to about 10% by weight of polyolefin, and preferably within the range of 0.05 to 3% by weight. The hindered-phenol antioxidant is used in an amount sufficient to stabilize the polyolefin against thermal degradation in the absence of copper, as is described in the foregoing references thereto. The hydrazine compound is used in an amount sufficient to reduce the effect of copper on such thermal degradation in the presence of the hindered-phenol antioxidant. Usually about equal amounts of each are used although this combination can be used in a weight ratio of 10:1 to 1:10 depending on the use to which the polyolefin is to be put and the environment to which it is to be exposed. The polyolefin composition stabilized by this stabilizer combination may also contain other additives, such as dyes, foaming agents, plasticizers, pigments, etc. as is conventional practice.

The following examples illustrate some especially preferred embodiments of this invention.

EXAMPLE 1

To 93 grams (0.458 mole) of ethyl 2-naphthoate was added 300 milliliters absolute ethanol and 125 grams anhydrous hydrazine. The reaction mixture was refluxed for about 16 hours, cooled to room temperature, and the white crystals which formed filtered. Recrystallization from ethanol (300 milliliters) gave 78 grams of pale yellow crystals of β-naphthoylhydrazine, m.p. 145°–147°C., yield 90.7%.

EXAMPLE 2

To 200 milliliters dimethylacetamide was added 78 grams (0.415 mole) of β-naphthoylhydrazine of Example 1 and 40 grams (0.5 mole) pyridine. A solution of 79 grams (0.415 mole) of β-naphthoyl chloride in dimethylacetamide was added; the reaction mixture was stirred for about 12 to 14 hours, and then poured into about 1 liter of water. The precipitated solid was filtered to give 140 grams, m.p. 235°–241°C. The solid material was dissolved in 1 liter pyridine, decolorized with charcoal, and benzene was added to the decolorized solution to give 113 grams of off-white solid N,N'-bis-(β-naphthoyl)hydrazine, m.p. 252°–253°C.

In a similar fashion, N,N'-bis(α-naphthoyl)hydrazine is prepared from hydrazine and an ester of α-naphthoic acid, and α-naphthoyl chloride.

EXAMPLE 3

A plurality of samples were prepared for testing by the following procedure. In a pint jar, the appropriate additive or additive combination (as indicated in the following table) was dry-blended with 50 grams of a copolymer of ethylene and propylene wire and cable grade, melt-flow 4.0 (Hercules). The mixture was then milled on a two-roll plastic mill at 170°C. for 3 minutes. The milled polymer was then molded into a plurality of 14 ± 2 mil films at 205°C. by heating in a press for 3 minutes under 28-ton pressure. The films were then cooled by forced air. A 1⅛ inch square 16 mil thick piece of 60 mesh copper screen was cleaned by heating in trichloroethylene and air drying, after which it was placed between two pieces of polymer film previously prepared and compression molded at 205°C. for 1.5 minutes to form a laminate 26–28 mils thick. The laminate was aged in a forced draft oven at 140°C. and the efficiencies of the various additives were measured in terms of the time (in hours) for the polymer to become embrittled. The results obtained were:

| Ar | Copper Inhibitor* | Ar¹ | Oven Aging at 140°C. Hour to Embrittlement |
| --- | --- | --- | --- |
|  | None |  | 7** |
|  | None |  | 170*** |
| β-naphthyl | β-naphthyl |  | 18**** |
| β-naphthyl | β-naphthyl |  | 2000–2200 |
| α-naphthyl | α-naphthyl |  | 1635 |

Notes:
*The copper inhibitors, identified in accordance with Formula I, supra, were used at a concentration of 0.2% in combination with 0.2% pentaerythrityl tetrakis-3-(3,5-di-t-butyl-4-hydroxy-phenyl)propionate, a hindered-phenol antioxidant.
**No copper inhibitor and no antioxidant used.
***0.2% antioxidant only, no copper inhibitor used.
****0.4% copper inhibitor only, no antioxidant used.

It is clear from the data in the foregoing table that (a) the copper inhibitor, N,N'-bis(α-naphthoyl)hydrazine, has no significant stabilizing properties against copper-catalyzed thermal degradation of polypropylene when used alone, (b) the conventional hindered-phenol antioxidant, provides poor stabilization against copper-catalyzed thermal degradation of polypropylene when used alone, and (c) the combinations of these copper inhibitors with the conventional hindered-phenol antioxidant provide a very high level of protection against copper-catalyzed thermal degradation of polypropylene.

EXAMPLE 4

A plurality of samples were prepared and tested by the procedure of Example 3. The results were:

| Additive* and Concentration | Oven Aging at 140°C. Hours to Embrittlement |
| --- | --- |
| None | less than 18 |
| 0.4% A | less than 18 |
| 0.4% D | 115 |
| 0.2% A plus 0.2% D | 1080 |
| 0.4% E | 270 |
| 0.2% A plus 0.2% E | 695 |
| 0.4% F | 320 |
| 0.2% A plus 0.2% F | 1010 |

Note:
*In the foregoing table, the additives were
A. The compound of Example 2 of this application, N,N'-bis(β-naphthoyl)hydrazine.
D. A commercially available hindered-phenol antioxidant, Ethyl 330, 1,3,5-trimethyl-2,4,6-tris(3,5-di-t-butyl-4-hydroxybenzyl)benzene.
E. A hindered-phenol antioxidant, 1,3,5-tris(4-t-butyl-3-hydroxy-2,6-dimethylbenzyl)-s-triazine-2,4,6-(1H,3H,5H)-trione, described and claimed in U.S. Pat. 3,723,427.
F. A hindered-phenol antioxidant, bis(4-t-butyl-3-hydroxy-2,6-dimethylbenzyl)dithioterephthalate, described and claimed in U.S. Application Serial No. 283,601 filed August 24, 1972.

As illustrated by the data in the foregoing table, (a) the combinations of a copper-inhibitor with various known hindered-phenol antioxidants in accordance with the present invention provides very high levels of protection against copper-catalyzed thermal degradation of polypropylene and (b) this combination is about two-and-a-half to nine times as effective as the same total weight of the hindered-phenol antioxidant alone.

I claim:

1. A stabilizer composition useful in the enhancement of the resistance of polyolefins to copper-catalyzed thermal degradation comprising, in combination, a hindered-phenol antioxidant and a compound of the formula

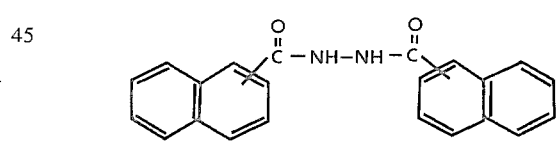

the weight ratio of said hindered-phenol antioxidant and said compound being between 10:1 and 1:10.

2. A composition as defined in claim 1 wherein said compound is N,N'-bis(α-naphthoyl)hydrazine.

3. A composition as defined in claim 1 wherein said compound is N,N'-bis(β-naphthoyl)hydrazine.

4. A composition as defined in claim 1 wherein said hindered-phenol antioxidant is pentaerythrityl tetrakis-3-(3,5-di-t-butyl-4-hydroxyphenyl)propionate.

5. A composition comprising a polyolefin and a stabilizing amount of the stabilizer composition of claim 1.

6. A composition as defined in claim 5 wherein said polyolefin is polypropylene.

7. A composition comprising a polyolefin and a stabilizing amount of the stabilizer composition of claim 2.

8. A composition comprising a polyolefin and a stabilizing amount of the stabilizer composition of claim 3.

9. Polypropylene stabilized against copper-catalyzed thermal degradation by the combination of (a) an amount of a hindered-phenol antioxidant sufficient to stabilize said polypropylene against thermal degradation in the absence of copper and (b) an amount of a compound of the formula

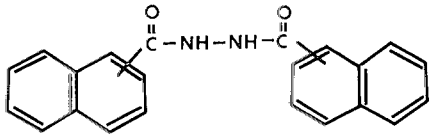

sufficient to reduce the effects of copper on such thermal degradation even in the presence of said hindered-phenol antioxidant.

10. A composition as defined in claim 9 wherein said compound is N,N'-bis(β-naphthoyl)hydrazine.

11. A composition as defined in claim 9 wherein said hindered-phenol antioxidant is pentaerythrityl tetrakis-3-(3,5-di-t-butyl-4-hydroxyphenyl)propionate.

* * * * *